United States Patent [19]
Garcia

[11] Patent Number: 4,815,211
[45] Date of Patent: Mar. 28, 1989

[54] EMERGENCY SEAT BELT CUTTER

[76] Inventor: Richard Garcia, 806 - 18th St., Corpus Christi, Tex. 78408

[21] Appl. No.: 73,683

[22] Filed: Jul. 15, 1987

[51] Int. Cl.⁴ .................................................. B26B 3/06
[52] U.S. Cl. ...................................... 30/162; 30/151; 30/155
[58] Field of Search .................. 30/151, 155, 162, 337

[56] References Cited

U.S. PATENT DOCUMENTS

| | | | |
|---|---|---|---|
| 928,134 | 7/1909 | Konigstein | 30/151 |
| 1,749,236 | 3/1930 | Stringfellow | 30/151 |
| 3,345,743 | 10/1967 | Paulson et al. | 30/337 |

Primary Examiner—Frank T. Yost
Assistant Examiner—Willmor Fridie, Jr.
Attorney, Agent, or Firm—Gilbert L. Wells

[57] ABSTRACT

An emergency seat belt cutter for mounting in the passenger compartment of a vehicle. The cutter has a handle, a long and narrow blade mounted longitudinally in a blade support portion integral with the handle and lugs on the handle for engagement with a sheath. The sheath has a cylindrical interior with a mounting for the inside of the vehicle, a coil spring in the bottom of the cylindrical interior and bayonet connectors for engagement with the lugs. The cutter is inserted into the sheath with pressure and a counterclockwise rotation. The cutter is removed by again applying transverse pressure and turning in a clockwise direction wherein the coil spring expels the knife into a person's palm.

7 Claims, 1 Drawing Sheet

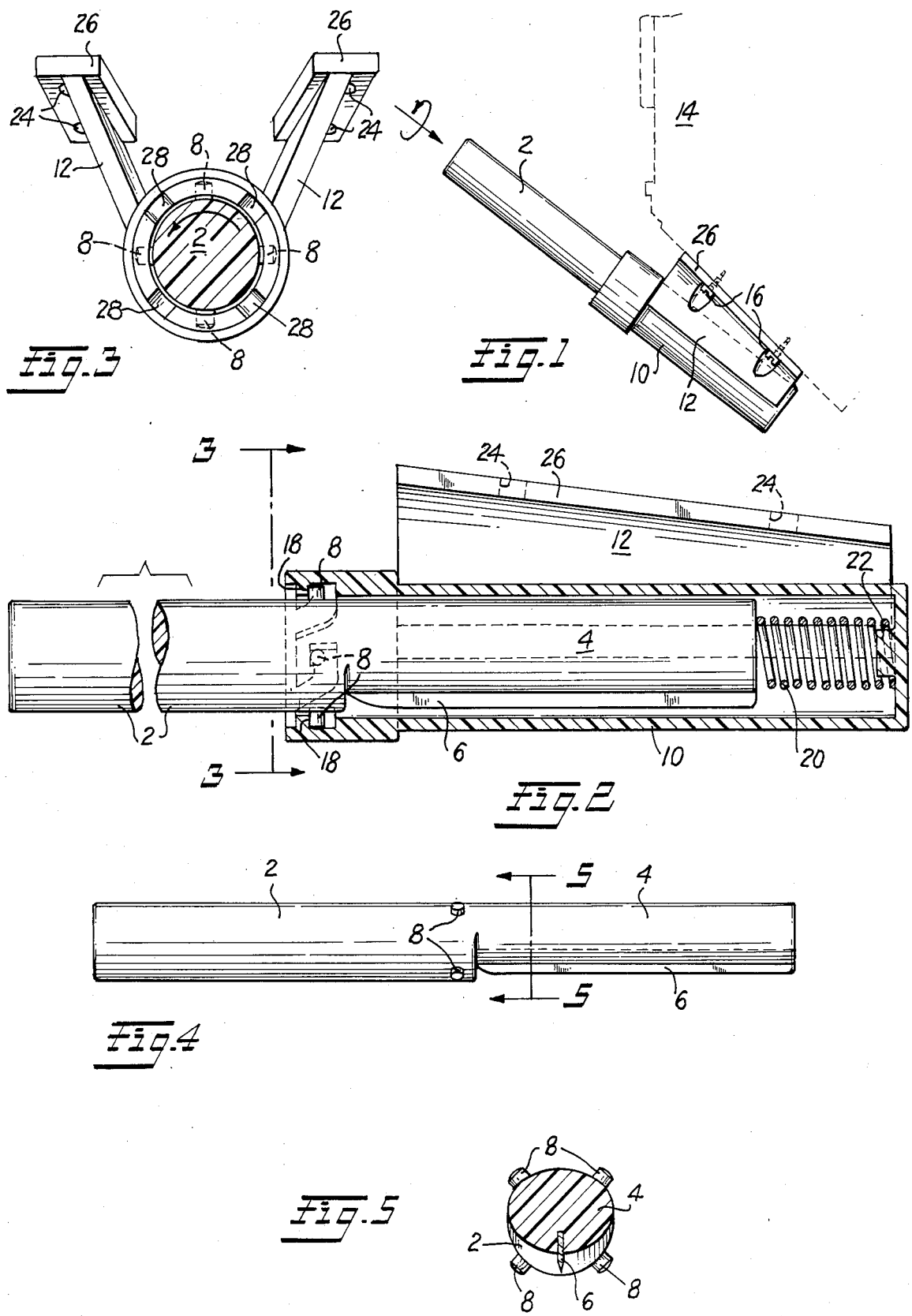

EMERGENCY SEAT BELT CUTTER

BACKGROUND OF THE INVENTION

The field of the invention is cutlery including a sheathed, sliding blade and the invention is particularly concerned with a knife mounted in a sheath and held therein by a latch.

U.S. Pat. Nos. 2,098,139; 3,176,395 and 4,337,576, are believed to show the state of the art of sheathed, sliding blade knives.

It is common knowledge that seat belts are required in automobiles and in some jurisdictions the law requires that seat belts be used at all times. One disadvantage of the use of seat belts may not be common knowledge and this is the frequent incidence of seat belts being jammed after a serious automobile accident.

Quite often when rescue crews arrive at the scene of a vehicular mishap they find injured motorists bound to their seats with no means for releasing the seat belts. This situation is exasercated when there is a fire resulting from a collision.

It sometimes happens that even without a collision a seat belt connector jams and an automobile passenger is imprisoned.

SUMMARY OF THE INVENTION

Having in mind the need for releasing jammed seat belts so that automobile passengers can escape from their unneeded embrace it is an object of the present invention to provide means for cutting automobile seat belts.

Another object of the present invention is to provide a safety device to be used when a vehicular seat belt becomes locked or jammed.

Still another object of the invention is to provide a safety blade having a blade exposure sufficient only for the cutting of seat belts.

Yet another object of the invention is a latch for a safety blade which prevents children from exposing the blade.

A further object of the invention is a mount for the inside of an automobile which provides easy access to the operator and passengers in the front seat.

Having the above objects in mind, an emergency belt cutter is provided having a three inch non-pointed blade with bumper guards providing 3/32 of an inch exposure for cutting two and a half inch safety belts. The case for the blade is a three and a half inch cylinder with a quick action spring inside the bottom and safety locks at the opening of the case which release the blade by rotation. A unitary mount on the cylinder facilitates fastening the emergency seat belt cutter within an automobile so that passengers have easy access thereto.

BRIEF DESCRIPTION OF THE DRAWINGS

An embodiment of the present invention is shown in the appended drawings, wherein:

FIG. 1 is a side elevation of the emergency seat belt cutter of the present invention, shown assembled under the dash board of a vehicle;

FIG. 2 is an enlarged fragmentary longitudinal sectional view of the seat belt cutter of FIG. 1;

FIG. 3 is a transverse vertical sectional view taken on line 3—3 of FIG. 2;

FIG. 4 is a side elevational view, on a smaller scale, of the seat belt removed from the holder; and FIG. 5 is an enlarged transverse vertical sectional view of the seat belt cutter of FIG. 4.

DESCRIPTION OF THE PREFERRED EMBODIMENT

With particular reference to FIGS. 4 and 5, the emergency seat belt cutter of the present invention is shown having a handle 2, a blade support portion 4, a blade 6, and locking lugs 8. The cutter is shown mounted in a cylindrical sheath 10 with unitary leg mounts 12 fastened under the dash board 14 of an automobile by fasteners 16 as shown in FIG. 1.

As shown in FIG. 2, the cylindrical sheath has four internal bayonet connectors 18 which engage and disengage the lugs 8 of the handle by rotation of the handle. Coil spring 20 mounted on the bottom of the cylindrical sheath on knob 22 biases the cutter by way of the lugs 8 against the bayonet connectors 18.

Holes 24 formed in feet 26 facilitate attachment of the integral mount for easy access by passengers in an automobile. Fasteners 16 can be replaced by "VELCRO" fasteners, adhesives, or plastic welding.

In addition to other features, FIG. 3 shows four ports 28 for entry and exit of lugs 8 into bayonet connectors 18.

The blade 6 protrudes about 3/32 inch from blade support portion 4 with about ⅔ of the width of the blade buried into the blade support portion.

Except for the blade 6 suitably made from stainless steel razor blade material, standard fasteners 16 and coil spring 20, the remaining components of the emergency belt cutter are suitably extrusion molded from plastic materials such as nylon, polystyrene, polyvinyl chloride, and ABS plastics.

BEST METHOD OF CARRYING OUT THE INVENTION

The cutter having handle 2, lugs 8 and blade support position 4, is extrusion molded about blade 6. The sheath 10 having internal bayonet connectors 18, knob 22 and integral mount 12 is extrusion molded in a second operation. Coil spring 20 is dropped into sheath 10 and expended over knob 22. The blade 6 is inserted into the sheath 10 with lugs 8 entering ports 28 and handle 2 is turned counter clockwise so that lugs 8 engage the hook of bayonet connectors 18.

To remove the cutter from the sheath the handle is pressed in and turned clockwise so that coil spring 20 expells the knife.

I claim:

1. An emergency seat belt cutter comprising:
   (a) a handle a circumferential surface;
   (b) a blade support portion abutting said handle and connected thereto;
   (c) a longitudinal cutting edge having more than half of its width embedded in said blade support portion;
   (d) a plurality of lugs extending vertically from said circumferential surface abutting said blade support portion;
   (e) a sheath having a cylindrical internal portion adapted to accept said blade support portion and said lugs;
   (f) mounting means including leg mounts and feet integral with said sheath for attaching said sheath to the interior of a vehicle;

(g) spring biasing means mounted in the bottom of said cylindrical internal portion and adapted to bias said blade support portion; and (h) means for securing said lugs at the top of said cylindrical internal portion.

2. The emergency seat belt cutter of claim 1, wherein said blade support portion has a blunt end.

3. The emergency seat belt cutter of claim 2, wherein said spring biasing means is a coil spring mounted on a knob integral with the bottom of said cylindrical internal portion adapted to contact said blunt end.

4. The emergency seat belt cutter of claim 3, wherein said means for securing said lugs are bayonet connectors integral with said cylindrical internal portion.

5. The emergency seat belt cutter of claim 4, wherein two thirds of the width of said blade is embedded in said blade support portion.

6. The emergency seat belt cutter of claim 5, wherein 3/32 inch of the width of said blade is exposed.

7. The emergency seat belt cutter of claim 6, wherein said blade is three inches long.

* * * * *